United States Patent
Kokeguchi et al.

(10) Patent No.: US 7,547,043 B2
(45) Date of Patent: Jun. 16, 2009

(54) PASSENGER PROTECTION DEVICE

(75) Inventors: Akira Kokeguchi, Hikone (JP);
Yoshihiko Tanaka, Hikone (JP)

(73) Assignee: Takata Corporation, Tokyo (JP)

( * ) Notice: Subject to any disclaimer, the term of this patent is extended or adjusted under 35 U.S.C. 154(b) by 388 days.

(21) Appl. No.: 11/280,409

(22) Filed: Nov. 17, 2005

(65) Prior Publication Data
US 2006/0125219 A1    Jun. 15, 2006

(30) Foreign Application Priority Data
Dec. 10, 2004   (JP) .............................. 2004-358658

(51) Int. Cl.
*B60R 21/231* (2006.01)
*B60R 21/015* (2006.01)

(52) U.S. Cl. .................................. 280/735; 280/743.1

(58) Field of Classification Search ............ 73/862.391;
280/729, 730.1, 731, 732, 735, 736, 741,
280/742, 743.1, 801.1, 808; 701/45; 340/668;
297/216.1, 216.13, 464, 465
See application file for complete search history.

(56) References Cited

U.S. PATENT DOCUMENTS

| | | | | |
|---|---|---|---|---|
| 5,489,119 A | * | 2/1996 | Prescaro et al. | 280/743.2 |
| 5,505,485 A | * | 4/1996 | Breed | 280/729 |
| 5,605,348 A | * | 2/1997 | Blackburn et al. | 280/735 |
| 5,965,827 A | * | 10/1999 | Stanley et al. | 73/862.391 |
| 5,996,421 A | * | 12/1999 | Husby | 73/862.451 |
| 6,081,759 A | * | 6/2000 | Husby et al. | 701/45 |
| 6,161,439 A | * | 12/2000 | Stanley | 73/862.391 |
| 6,254,121 B1 | * | 7/2001 | Fowler et al. | 280/729 |
| 6,264,236 B1 | * | 7/2001 | Aoki | 280/735 |
| 6,301,977 B1 | * | 10/2001 | Stojanovski | 73/862.393 |
| 6,308,983 B1 | * | 10/2001 | Sinnhuber | 280/735 |
| 6,311,571 B1 | * | 11/2001 | Norton | 73/862.637 |
| 6,447,011 B1 | | 9/2002 | Curtis et al. | |
| 6,536,797 B1 | | 3/2003 | Reich | |
| 6,623,032 B2 | | 9/2003 | Curtis et al. | |
| 6,676,158 B2 | * | 1/2004 | Ishikawa | 280/743.1 |
| 6,860,160 B2 | | 3/2005 | Curtis et al. | |
| 6,959,779 B2 | | 11/2005 | Curtis et al. | |
| 2002/0038573 A1 | * | 4/2002 | Clark | 73/862.391 |
| 2002/0084638 A1 | | 7/2002 | Neupert | |

(Continued)

FOREIGN PATENT DOCUMENTS

DE    103 46 625 A1    5/2005

(Continued)

OTHER PUBLICATIONS

RD 440068 A, Dec. 2000.*

*Primary Examiner*—Faye M. Fleming
*Assistant Examiner*—Laura Freedman
(74) *Attorney, Agent, or Firm*—Foley & Lardner LLP (57) ABSTRACT

A passenger protection device may be configured with an airbag including a protection space portion region for alleviating restraint pressure at the time of restraining a passenger, so as to restrain the passenger, regardless of difference in physical build of the passenger on the vehicle seat at the time of expansion and inflation. A determination may be made regarding whether or not a directly seated object on the vehicle seat is a passenger or a child seat based on the tension information from a belt tension sensor. Depending on the outcome of the determination, performance of an airbag or an inflator may be controlled by a control device.

8 Claims, 5 Drawing Sheets

U.S. PATENT DOCUMENTS

| | | |
|---|---|---|
| 2003/0066362 A1 | 4/2003 | Lee et al. |
| 2003/0168842 A1* | 9/2003 | Igawa ...................... 280/743.2 |
| 2004/0079176 A1* | 4/2004 | Sullivan et al. ........ 73/862.391 |
| 2004/0145161 A1* | 7/2004 | Hasebe et al. ............... 280/729 |
| 2004/0155440 A1 | 8/2004 | Hasebe et al. |
| 2004/0164526 A1* | 8/2004 | Hasebe et al. ............... 280/729 |

FOREIGN PATENT DOCUMENTS

| | | |
|---|---|---|
| JP | 11-20607 | 1/1999 |
| WO | WO 01/53134 A1 | 7/2001 |

\* cited by examiner

PASSENGER PROTECTION DEVICE

BACKGROUND

The present invention relates to a passenger protection device installed in a vehicle, and more particularly relates to a technique for configuring a passenger protection device so as to implement thorough passenger protection using an airbag and a seatbelt.

A conventional configuration of a passenger protection device for implementing thorough passenger protection using an airbag and a seatbelt at the time of a vehicle accident is known. For example, Japanese Unexamined Patent Application Publication No. 11-20607 discloses a passenger protection device of a configuration where a passenger detecting means for detecting whether or not a passenger is seated, the weight thereof, whether or not a child seat is present, and so forth is provided, and an airbag is controlled based on the passenger detecting means.

However, with the passenger protection device described in Japanese Unexamined Patent Application Publication No. 11-20607 (incorporated by reference herein), a combination of a weight sensor serving as passenger detecting means and a belt tension sensor for detecting the tension of the seatbelt installed to the vehicle seat are a common configuration for determining the directly seated object on the vehicle seat. With this configuration, in the event that the directly seated object is a passenger, the weight sensor is used, and on the other hand, in the event that the directly seated object is a child seat, there is a need to ensure reliable detection by also using the belt tension sensor in addition to the weight sensor, since the tightening force of the seatbelt acts upon the vehicle seat. Accordingly, with such a configuration, both a weight sensor and a belt tension sensor are necessary, and further, highly-reliable sensors and complicated circuits are necessary to suppress detection error, leading to increased costs.

Accordingly, there is a great demand for reducing device costs in the design of this type of passenger protection device by creating a mechanism capable of accurately determining the directly seated object on the vehicle seat with the conventional configuration.

The present invention has been made in light of these points, and it is an object thereof to provide an effective technique to realize a passenger protection device capable of implementing thorough passenger protection at low costs.

SUMMARY OF THE INVENTION

The present invention is configured to solve the above-described problems. The present invention can be applied to configuration techniques of passenger protection devices installed in automobiles and other vehicles.

According to an embodiment of the present invention, a passenger protection device for a vehicle includes an airbag configured to expand and inflate in a passenger protection region, wherein said airbag includes a recessed region that alleviates restraint pressure at a time of restraining a passenger at a middle region of the airbag when the airbag is expanding and inflating, so as to restrain said passenger regardless of a difference in physical build of the passenger on a vehicle seat, an inflator for supplying gas for expansion and inflation of said airbag, a seatbelt mounted to the vehicle seat, a seatbelt sensor for detecting tension information relating to a tension acting on said seatbelt, and a control device configured to determine whether or not a directly seated object on the vehicle seat is a passenger or a child seat based on said tension information from said seatbelt sensor, wherein in the event that a determination is made that said directly seated object is a passenger the control device is configured to control said inflator in a first gas supplying mode such that the recessed region of said airbag expands and inflates with a restraining pressure that is alleviated in relation to said passenger, while in the event that a determination is made that said directly seated object is a child seat, the control device is configured to control said inflator in a second gas supplying mode so as to suppress effects of the retaining pressure of said airbag in relation to the passenger in the child seat.

According to an embodiment of the present invention, a passenger-protection-device-installed vehicle includes a vehicle seat and a passenger protection device that includes an airbag configured to expand and inflate in a passenger protection region, wherein said airbag includes a recessed region that alleviates restraint pressure at a time of restraining a passenger at a middle region of the airbag when the airbag is expanding and inflating, so as to restrain said passenger regardless of a difference in physical build of the passenger on the vehicle seat, an inflator for supplying gas for expansion and inflation of said airbag, a seatbelt mounted to the vehicle seat, a seatbelt sensor for detecting tension information relating to a tension acting on said seatbelt, and a control device configured to determine whether or not a directly seated object on the vehicle seat is a passenger or a child seat based on said tension information from said seatbelt sensor, wherein in the event that a determination is made that said directly seated object is a passenger the control device is configured to control said inflator in a first gas supplying mode such that the recessed region of said airbag expands and inflates with a restraining pressure that is alleviated in relation to said passenger, while in the event that a determination is made that said directly seated object is a child seat, the control device is configured to control said inflator in a second gas supplying mode so as to suppress effects of the retaining pressure of said airbag in relation to the passenger in the child seat.

It is to be understood that both the foregoing general description and the following detailed description are exemplary and explanatory only, and are not restrictive of the invention as claimed.

DETAILED DESCRIPTION

These and other features, aspects, and advantages of the present invention will become apparent from the following description, appended claims, and the accompanying exemplary embodiments shown in the drawings, which are briefly described below.

The airbag according to the present invention may be configured as an airbag having a function of expanding and inflating in a passenger protection region at the time of a vehicle accident. According to an embodiment of the present invention, the airbag may have a configuration with a recessed region for alleviating restraint pressure at the time of restraining a passenger at the middle region thereof when expanding and inflating, so as to restrain the passenger regardless of difference in physical build of the passenger on the vehicle seat. Passengers with various physical builds can be restrained by this recessed region, which is made with an alleviated restraining pressure, so as to suitably restrain passengers of various physical builds, from children to adults, thereby protecting the passenger. Specifically, portions to be protected such as the head, shoulders, chest, and so forth, of the passenger, may be received by the recessed region with the restraining pressure alleviated, and shock absorption is suitably performed regardless of the physical build of the passenger, as well as, movement of the passenger in the left and right directions is prevented by the left and right wall faces of the recessed region. An airbag with such a configuration is effective in simplifying the passenger protection device and lowering costs by replacing the functions of the weight sensor in the known configuration. which detects the physical build of the passenger, with the innovative design of the shape of the airbag. Note that "when expanding and inflating" in the present invention broadly includes the timing from the airbag beginning to expand and inflate through the expanding and inflating process and up to completion of inflation.

The inflator according to the present invention functions as gas supplying device for supplying gas for expanding and inflating to the air bag of the above configuration at the time of a vehicle accident. A single-structure inflator capable of supplying gas at a single pressure, or an inflator capable of switching the gas supplying pressure in multiple steps, can be used as the inflator. The airbag and inflator and the like make up a device so-called "airbag module or airbag device".

The seatbelt according to the present invention may be a long belt mounted to the vehicle seat, and is also called "webbing". Typically, this seatbelt is used for a passenger or a child seat sitting in the vehicle seat. Tension information regarding tension acting upon this seatbelt may be detected by the seatbelt sensor according to the present invention. Now, "tension information regarding tension" as used here encompasses the first information which quantitatively or qualitatively indicates change over time of tension per unit time, the second information indicating the value of tension at an arbitrary time, the third information which is a combination of the first information and second information, and so forth.

The control device according to the present invention may be configured as a control device for determining whether a directly seated object on the vehicle seat is a passenger (person) or a child seat, based on tension information detected by the seatbelt sensor of the above-described configuration, for controlling the gas supply mode of the inflator according to the determination results. Accordingly, the gas supply mode of the inflator, such as the flow of gas supply, gas supply pressure, gas supply time, gas supply speed, and so forth, may be controlled. Specifically, in the event that determination is made that the directly seated object is a passenger, the control device controls the inflator in a first gas supply mode such that the recessed region of the airbag expands and inflates with a restraining pressure that is alleviated in relation to the passenger. Controlling the inflator in the first gas supply mode creates a restraining state for the airbag which is suitable to the passenger. On the other hand, in the event that determination is made that the directly seated object is a child seat, the control device controls the inflator in a second gas supply mode so as to suppress effects of the retaining pressure of the airbag as to the passenger in the child seat, such as a newborn, infant, toddler, child, etc. Controlling the inflator in the second gas supply mode controls the airbag such that the restraint pressure thereof does not affect the passenger in the child seat, i.e., such that the inflating actions thereof are suppressed. "Second gas supply mode" as used here broadly includes a gas supply stopped mode wherein supply of gas from the inflator to the airbag is completely stopped, a state wherein gas is supplied to the airbag at a lower gas pressure or a smaller gas flow than in the first gas supply mode, and so forth.

Note that the control device is typically configured as a CPU (Central Processing Unit), input/output device, storage memory, peripheral devices, and so forth. Also, according to an embodiment of the present invention, with this control device a determining mechanism unit for determining information relating to a directly seated object and a control mechanism unit for controlling the gas supply mode of the inflator can be the same component or separate components.

According to an embodiment of the present invention, using the above-described passenger protecting device can realize a passenger protection device capable of implementing thorough passenger protection, at low costs. That is to say, whether a directly seated object is a passenger or a child seat can be determined simply by using a seatbelt sensor, so there is no need to use a weight sensor of a known configuration, and a determining mechanism with high determining precision is configured with a simple design. The functions of the weight sensor of the known configuration for detecting the physical build of the passenger and so forth is substituted with an innovative design for the shape of the airbag, thereby implementing thorough passenger protection regardless of the physical build.

According to an embodiment of the present invention, the passenger protection device may include a single-structure inflator capable of supplying gas at a single pressure. The control device may control the inflator so as to supply gas at a single pressure to the airbag as the first gas supply mode in the event that determination has been made that the directly seated object on the vehicle seat is a passenger. On the other hand, the control device may control the inflator in the second gas supply mode so as to achieve a gas supply stopped state, where the supply of gas to the airbag is stopped in the event that a determination has been made that the directly seated object on the vehicle seat is a child seat. That is to say, with the present invention, the single-structure inflator may operate in the event that the directly seated object on the vehicle seat is a passenger, and the operation of the inflator itself may stop in the event that the directly seated object on the vehicle seat is a child seat.

According to such a configuration, the structure of the inflator may be simplified due to the use of a single-structure inflator capable of supplying gas at a single pressure, further reducing costs of the passenger protection device.

According to an embodiment of the present invention, the passenger protection device, based on tension changes over time, which is the tension information detected by the seatbelt sensor, the control device determines that the directly seated object is a passenger in the event that the tension fluctuates over time, and on the other hand determines that the directly seated object is a child seat in the event that the tension stays generally constant over time.

Now, in the event of taking into consideration tension detection error and the like, "tension acting on the seatbelt fluctuates over time" means a case where tension change exceeds a stipulated range set beforehand or a case where the tension value differs from a predetermined value. On the other hand, "tension acting on the seatbelt stays generally constant over time" means a case where tension stays within the stipulated range set beforehand or a case where tension remains a predetermined value over time. The stipulated range in these cases is set appropriately, taking into consideration detection error and the like.

Such a configuration can realize a passenger protection device capable of implementing thorough passenger protection, at low costs, and further, the determination precision of the directly seated object can be further improved by the configuration wherein the directly seated objected is determined based on the change over time of the tension detected by the seatbelt sensor.

According to an embodiment of the present invention, in the event that a determination is made that the directly seated object is a child seat, the control device further determines the installation arrangement of the child seat, based on the tension values, including absolute values of tension, serving as the tension information detected by the seatbelt sensor. Here, "installation arrangement of the child seat" assumes installation arrangements such as facing forward, facing sideways, facing backward, and so forth. The installation arrangement of the child seat can be determined by storing tension data for the cases of installing a child seat facing forward, facing sideways, facing backward, and so forth, by performing testing beforehand, and comparing the tension data with the actually detected tension values. The control device controls the inflator and other components subject to be controlled, e.g., seatbelt pretensioner, according to the installation arrangement of the child seat that has been determined. Accordingly, detailed passenger protection can be implemented for the passenger in the child seat.

According to an embodiment of the present invention, the passenger protection device includes an airbag that includes a right airbag which expands and inflates at the right forward side of a passenger, a left airbag which expands and inflates at the left forward side of the passenger, and a space portion which opens toward the passenger at the center region between the right airbag and the left airbag at the time of expansion and inflation, where the space portion is configured as the recessed region. With an airbag having such a configuration, portions to be protected, such as the head, shoulders, chest, and so forth, of the passenger, are received by the space portion or recessed region or with a restraining pressure that is alleviated. Furthermore, movement of the passenger in the left and right directions is prevented by the right airbag and the left airbag. Also, with an airbag having such a configuration, the right airbag receives the right chest of the passenger, and the left airbag receives the left chest of the passenger. The left and right chest of the passenger have strong, hard ribs, so the airbag may receive and absorb the shock of the passenger through the ribs. Also, the area of the sternum at the middle of the chest of the passenger may face the space portion or recessed region, so at the time of the body of the passenger striking into the airbag, the area of the chest where the sternum exists is not subjected to very great reactive force from the airbag, so the load on the area of the sternum is reduced. With such a configuration, the functions of the weight sensor of the known configuration for detecting the physical build of the passenger and so forth can be substituted with the innovative design of the shape of the airbag. In particular, a substitution with an airbag of a configuration with a center region that is opened as a space portion facing the passenger between the right airbag and the left airbag is made, and further thorough passenger protection is implemented with this airbag.

According to an embodiment of the present invention, a vehicle is provided with a passenger safety device according to one of the embodiments described above. According to such a configuration, a vehicle installed with a low-cost passenger protection device is provided, and cost-reduction advantages of the vehicle are furthered.

Embodiments of the present invention will now be described in detail with reference to the drawings. First, a passenger protection device 100 which is a first embodiment of the "passenger protection device" according to the present invention will be described with reference to FIG. 1 through FIG. 5. Here, an example will be described of the passenger protection device 100 for implementing protection of an object of protection using a passenger seat side airbag and seatbelt installed in an automobile which is a "passenger-protection-device-installed vehicle" according to the present invention.

Figure 1:
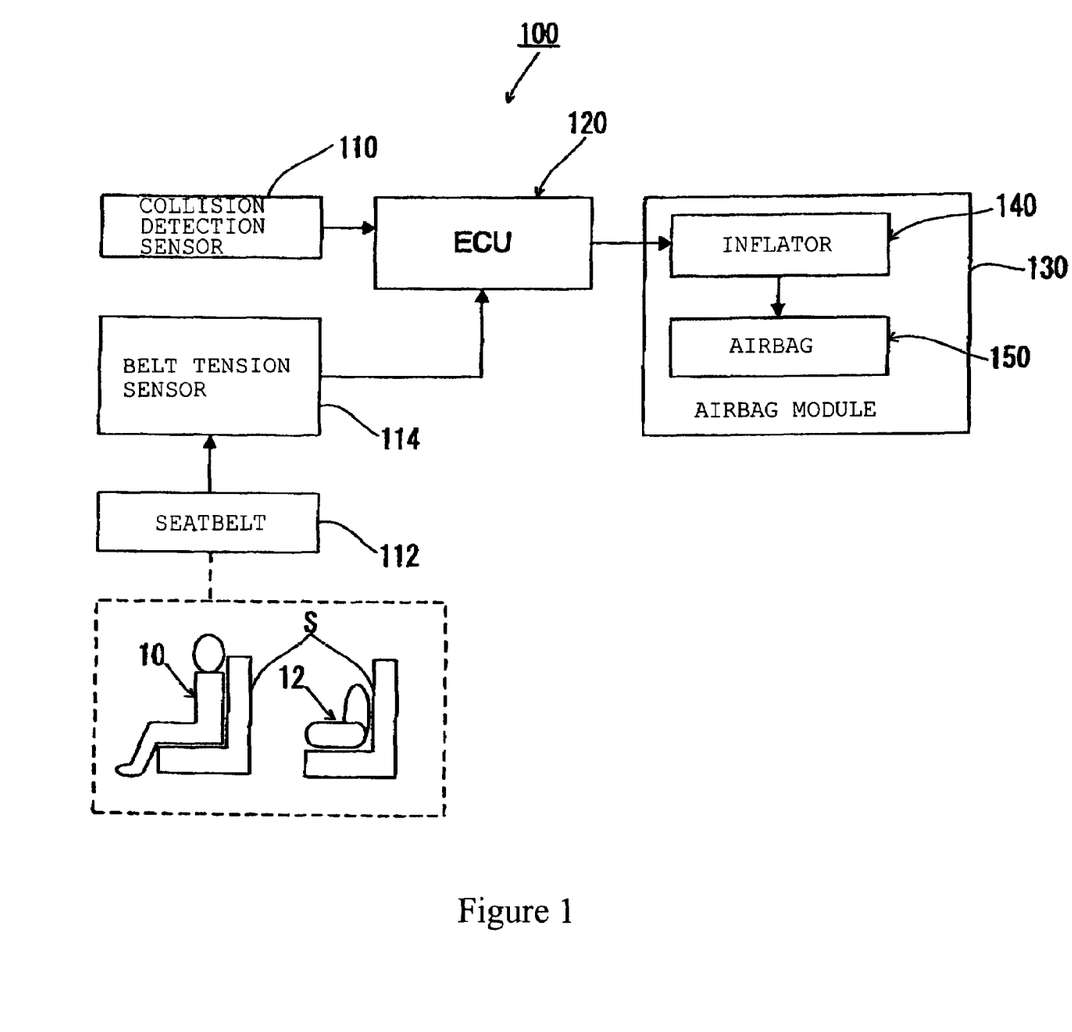
FIG. 1 is a diagram illustrating the system configuration of the passenger protection device 100, according to an embodiment of the present invention.

FIG. 1 illustrates the system configuration of the passenger protection device 100 according to an embodiment of the present invention.

As shown in FIG. 1, the passenger protection device 100 according to the present embodiment, may include at least a collision detection sensor 110, a seatbelt 112, a belt tension sensor 114, an ECU 120, and an airbag module or airbag device 130.

The collision detection sensor 110 may be configured to use a speed sensor for detecting the speed of the vehicle and an acceleration sensor for detecting acceleration acting on the vehicle in triaxial (X axis, Y axis, Z axis) directions, with the detection information detected by these sensors being transmitted to the ECU 120, thereby determining occurrence of a collision accident.

The seatbelt 112 is a long belt mounted to a passenger seat S for example, and is also called "webbing". The seatbelt 112 is used on a passenger 10 seated in the passenger seat S, or a child seat 12 placed on the passenger seat S. This seatbelt 112 corresponds to the "seatbelt" of the present invention.

The belt tension sensor 114 may be configured as a sensor having functions for detecting tension information relating to tension acting upon the seatbelt 112 (equivalent to "tension information" in the present invention), for example, quantitatively or qualitatively detecting changes in tension acting upon the seatbelt 112 over time per unit time when the seatbelt is worn. The belt tension sensor 114 may be a sensor for detecting tension information relating to tension acting upon the seatbelt 112 at the time of wearing the seatbelt, and corresponds to the "seatbelt sensor" of the present invention.

The ECU 120 may be configured to be a CPU (Central Processing Unit), input/output device, storage memory, peripheral devices, or other control device known in the art. Various detection information detected by the collision detection sensor 110, belt tension sensor 114, and other various detection sensors relating to the vehicle, are sent to the ECU 120, and the ECU 120 controls the various objects of control, such as the airbag module 130. This ECU 120 makes up the "control device" of the present invention.

The air bag module 130 may be primarily configured as an inflator 140 (gas supplying device) and an airbag 150, and may be disposed in the instrument panel in front of the passenger seat of the automobile. The inflator 140 functions as a gas supply means for supplying gas to the air bag 150 for expanding and inflating at the time of a vehicle accident.

According to an embodiment of the present invention, the inflator 140 may be configured as a single-structure inflator capable of supplying gas at a single pressure, achieving a state of supplying gas of a single pressure to the airbag when operating, and on the other hand achieving a gas supply stopped state when the supply of gas to the airbag is stopped, such as when the inflator is not operating. This inflator 140 corresponds to the "inflator" of the present invention.

The air bag 150 may be stored in a box-shaped case (omitted in drawings) in a folded state according to a predetermined form. The case may be covered with a cover (omitted in drawings), such as a lid or the like. At the time of a vehicle accident this lid is torn open by the pressing force from the airbag 150 at the time the airbag 150 expands during inflation, and the airbag 150 is allowed to expand and inflate into the passenger protection region. This airbag 150 corresponds to the "airbag" of the present invention.

Figure 2:
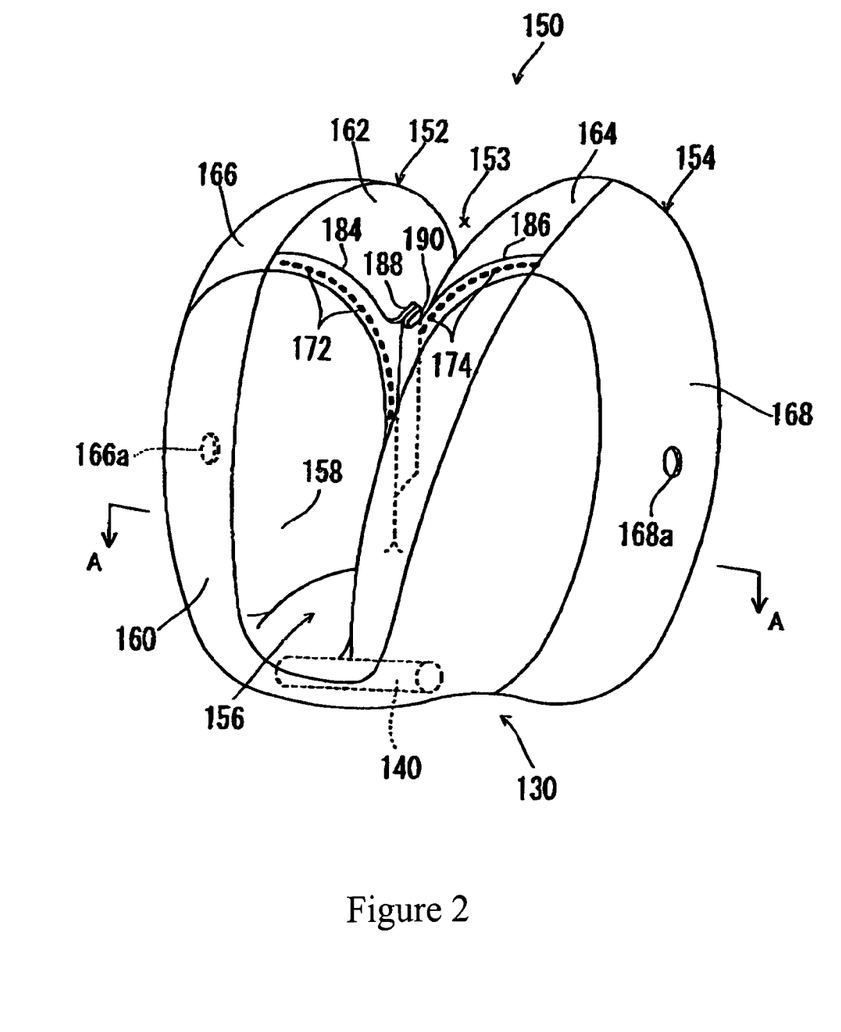
FIG. 2 is a perspective view of the airbag 150 in an expanded, inflated state, according an embodiment of the present invention.
Figure 3:
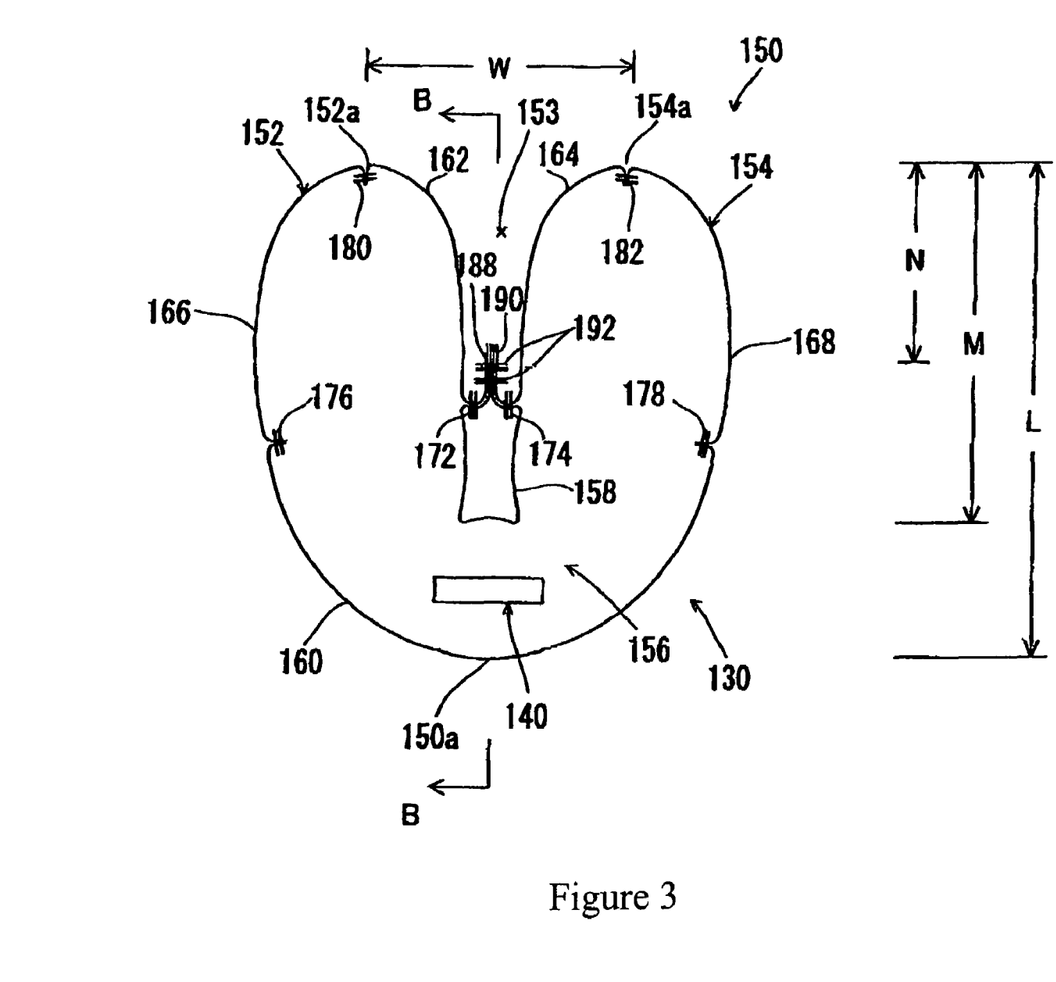
FIG. 3 illustrates a cross-sectional configuration of the airbag 150 along line A-A in FIG. 2.
Figure 4:
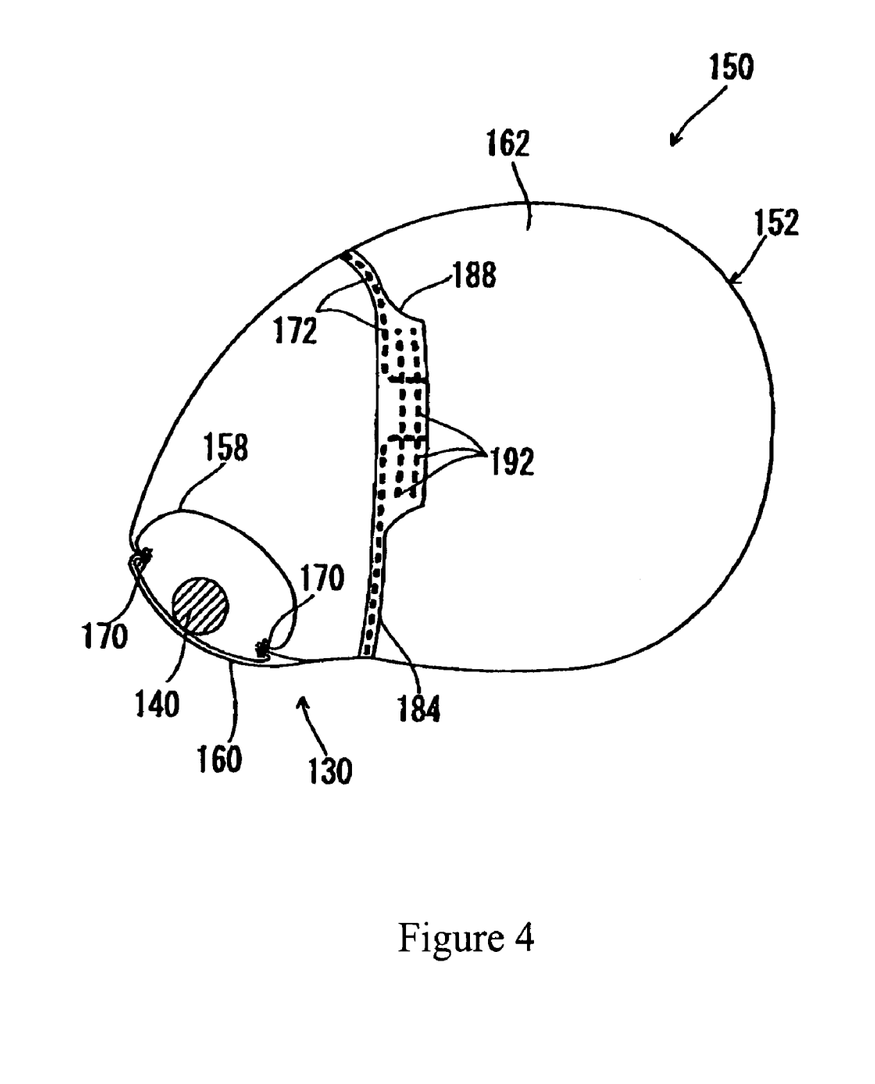
FIG. 4 illustrates a sectional-sectional configuration of the airbag 150 along line B-B in FIG. 3.

The configuration of the above airbag 150 will be described in detail with reference to FIG. 2 through FIG. 4. FIG. 2 illustrates a perspective view of the airbag 150, according to an embodiment of the present invention, where the airbag 150 is in an expanded inflated state. FIG. 3 illustrates a cross-sectional configuration of the airbag 150 along line A-A in FIG. 2. FIG. 4 illustrates a sectional-sectional configuration of the airbag 150 along line B-B in FIG. 3.

As shown in FIG. 2 through FIG. 4, the airbag 150 according to the present embodiment may include a right airbag 152 that expands and inflates at the right side toward the front of the vehicle, a left airbag 154 which expands and inflates at the left side toward the front of the vehicle, and a communicating portion 156 which connects an end of each of the right airbag 152 and the left airbag 154. This communicating portion 156 may form the base side of the airbag 150, which expands and inflates while the right airbag 152 and the left airbag 154 expand and inflate in directions away from the communicating portion 156.

The airbag 150 may be formed by sewing together a rear inner panel 158, a rear outer panel 160, front inner panels 162 and 164, and front outer panels 166 and 168. Specifically, seams 172 and 174 shown in FIG. 2 and FIG. 3 illustrate seams or stitches formed by sewing together the rear inner panel 158 and the front inner panels 162 and 164. Also, seams 176 and 178 shown in FIG. 3 illustrate seams or stitches formed by sewing together the rear outer panel 160 and the front outer panels 166 and 168. Also, seams 180 and 182 shown in FIG. 3 illustrate seams or stitches formed by sewing together the front inner panels 162 and 164 and the front outer panels 166 and 168. Also, seam 170 shown in FIG. 4 illustrates a seam or stitches formed by sewing together the rear inner panel 158 and the rear outer panel 160.

Also, stitching margins or seam margins 184 and 186 between the rear inner panel 158 and the front inner panels 162 and 164 may be each disposed so as to be exposed to the outer face of the right airbag 152 and the left airbag 154 in the airbag product. Tongue-shaped linking margins 188 and 190 may be erected from the stitching margins 184 and 186. The linking margins 188 and 190 may be sewn together by a seam 192. In this way, the portions of the right airbag 152 and the left airbag 154 that face one another are linked together partway along the inflating direction by the stitching margins 184 and 186 between the rear inner panel 158 and the front inner panels 162 and 164.

Also, the front outer panels 166 and 168 may have vent holes 166a and 168a respectively, with the vent holes 166a and 168a formed on the outer-facing side faces of the right airbag 152 and the left airbag 154.

As shown in the example of FIG. 2, at the time of this airbag 150 expanding and inflating, there is no bridging member such as a tie panel or the like between the tip portions of the right airbag 152 and the left airbag 154. With regard to portions of the airbag 150 which face the object of protection, i.e. the passenger, the center region, as to the left and right directions, is recessed forwards, thereby forming a protection space portion or recessed region 153. This protection space portion 153 is opened upwards in FIG. 2. This protection space portion 153 corresponds to the "space portion" and "recessed region" according to the present invention, and the right airbag 152 and the left airbag 154 each correspond to the "right airbag" and "left airbag" according to the present invention.

As shown in the example of FIG. 3, in the state that the airbag 150 has completed expanding and inflating, the spacing W between the foremost tip 152a of the right airbag 152 and the foremost tip 154a of the left airbag 154 may preferably be 150 to 450 mm in width. More preferably, the spacing W may be 170 to 430 mm in width.

Also, the horizontal distance M from the foremost tips 152a and 154a to the deepest portion of the protection space portion 153 of the airbag 150, in contrast to the horizontal distance L from the base 150a to the tip of the airbag 150, of which expanding and inflating has been completed, may preferably be 280 to 480 mm. More preferably, the horizontal distance M may be 310 to 450 mm.

Also, this airbag 150 may have a partway portion in the direction of expanding and inflating on the right airbag 152 and a partway portion in the direction of expanding and inflating on the left airbag 154 joined by a seam 192. The horizontal distance N from this seam 192 to the foremost tips 152a and 154a may preferably be 50 to 300 mm. More preferably, the horizontal distance N may be 90 to 260 mm.

Note that the distance from the base 150a of the airbag 150, of which expanding and inflating has been completed, to the seam 192 may preferably be 30 to 70% of the horizontal distance L of the airbag 150. More preferably, the distance from the base 150a of the airbag 150 to the seam 192 may be around 40 to 55% of the horizontal distance L.

Next, the action of the airbag module 130 of the above-described configuration will be described with reference to FIG. 2 through FIG. 4.

At the time of a vehicle collision, the airbag module 130 in the initial state operates, causing gas for expanding and inflating to be supplied from the inflator 140 to inside the communicating portion 156 of the airbag 150 in a mode such as "gas supply mode A" or "gas supply mode B", which will be described later. The gas from the inflator 140 flows into the right airbag 152 and the left airbag 154 from the communicating portion 156 so that the right airbag 152 and the left airbag 154 perform an expanding and inflating action (an action of inflating while expanding) in the right side and left side of the passenger protection regions in front of the passenger, respectively.

Next, "passenger protection control" with the passenger protection device 100 of the configuration described above will be described with reference to the passenger protection control flowchart according to the present embodiment shown in FIG. 5. This passenger protection control is operated by the ECU 120.

Figure 5:
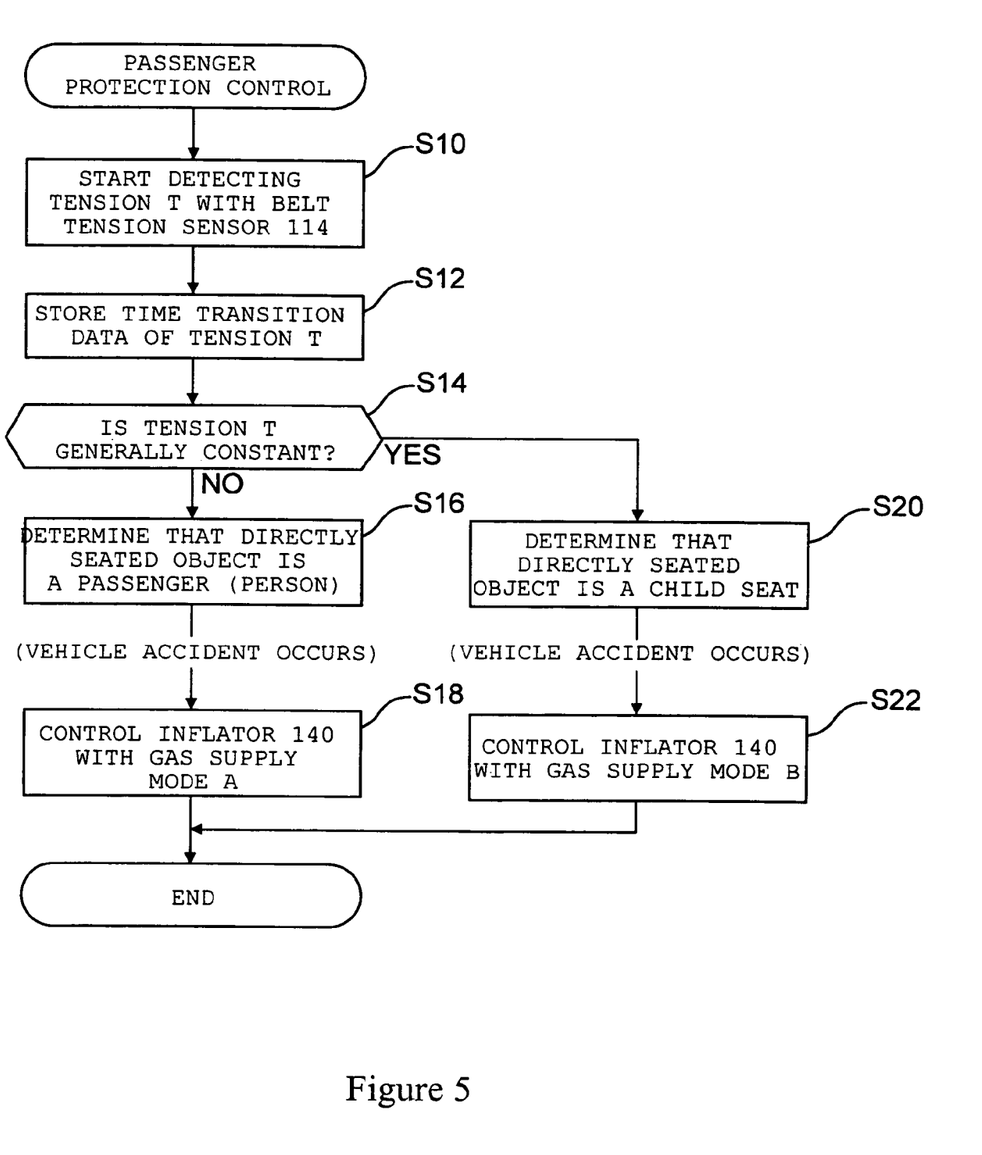
FIG. 5 is a flowchart of passenger protection control according an embodiment of the present invention.

The "passenger protection control" according to the present embodiment may be executed by sequentially carrying out the steps from step S10 through S22 shown in FIG. 5.

First, in step S10, detection of the tension T acting on the seatbelt 112 is commenced by the belt tension sensor 114. A prerequisite for commencing this detection of the tension T is that the seatbelt 112 is being worn by the passenger sitting on the seat or a child seat is placed on the seat. Typically, detection of the tension T by the belt tension sensor 114 is started when a buckle sensor or buckle switch detects that the tongue of the seatbelt 112 is latched to the seatbelt buckle. Information that is detected by the belt tension sensor 114, either continuously or at regular time intervals, is processed by the CPU (Central Processing Unit) and then stored in the storage device in step S12, as necessary. Thus, changes in the tension T over time, may be stored.

Following a predetermined amount of time elapsing from commencing detection of the tension T, a determination is made in step 14 regarding whether the tension T has stayed generally constant, based on the change over time of the tension T stored in step S12. Note that at the time of determination, "tension T acting upon the seatbelt 112 stays generally constant" may mean a case where the tension T has stayed within a stipulated tension range set beforehand or may mean a case where the tension T has stayed a predetermined tension value. The stipulated tension range may be set to suitably take into consideration detection error and the like.

In the event that a determination is made that the tension T has not stayed constant, i.e., has changed over time (a value of "NO" in step S14), a determination is made in step S16 that the directly seated objected is a "passenger (person)". In the event that a determination is made in step S16 that the directly seated objected is a "passenger (person)", the inflator 140 is controlled in step S18 in a gas supply mode A which satisfies conditions such as gas supply flow, gas supply pressure, gas supply time, gas supply acceleration, etc., corresponding to the passenger (corresponding to the "first gas supply mode" according to the present invention).

Specifically, the inflator 140 may be controlled such that protection space portion 153 of the airbag 150 expands and inflates so that a restraining pressure to the passenger is alleviated. Accordingly, portions to be protected such as the head, shoulders, chest, and so forth, of the passenger are received by the protection space portion or recessed region 153, in which restraining pressure is alleviated, and movement of the passenger in the left and right directions is prevented by the right airbag 152 and the left airbag 154 at the time of the airbag 150 expanding and inflating. Thus, the structure in which the airbag 150 is provided with the protection space portion 153 enables implementing thorough passenger protection even when the physical build and age and so forth of passengers differ. That is to say, it is only required to determine that the directly seated object is a passenger (person) by employing the airbag 150 having the protection space portion 153, omitting the need for determining physical build and age and so forth.

Also, with this airbag 150, in the event that one of the right airbag 152 and the left airbag 154 expands and inflates before the other from a stored, folded state, so that expansion and inflation of the other lags, the airbag which expands and inflates first pulls the other airbag that lags in expansion and inflation, because the right airbag 152 and the left airbag 154 are mutually linked, thereby encouraging mutual expansion and inflation. Moreover, the right airbag 152 and the left airbag 154 are linked at the partway portions thereof in the direction of expanding and inflating by the seam 192, so the airbag which has started expanding and inflating first begins to pull the other which is lagging in expansion and inflation in the direction of expanding and inflating during the relatively initial stages following the start of expanding and inflating. Accordingly, both the right airbag 152 and the left airbag 154 expand and inflate smoothly and generally uniformly between the right and left sides from the initial stages of expanding and inflating.

Also, the left and right chest of the passenger has strong, hard ribs, so the airbag 150 may receive and absorb the shock of the passenger through the ribs. Also, the area of the sternum at the middle of the chest of the passenger may face the protection of space portion or recessed region 153, so at the time that the body of the passenger strikes into the airbag 150 the area of the chest where the sternum exists is not subjected to very great reactive force from the airbag 150, so the load on the area of the sternum is reduced. Note that gas within the airbag 150 following expansion and inflation may flow out through the vent holes 166a and 168a, so shock acting upon the passenger may be absorbed. Accordingly, the airbag can achieve a restraining state which is suitable to the passenger, thereby implementing thorough protection of the passenger.

In the event that the determination is made that the tension T has stayed generally constant (a value of "YES" in step S14), determination is made in step S20 that the directly seated objected is a "child seat". In the event that a determination is made in step S20 that the directly seated objected is a "child seat", the inflator 140 is controlled in step S22 in a gas supply mode B which satisfies conditions such as gas supply flow, gas supply pressure, gas supply time, gas supply acceleration, etc., corresponding to the child seat passenger seated in the child seat (corresponding to the "second gas supply mode" according to the present invention).

Specifically, the inflator 140 may be controlled so as to suppress effects of the restraining pressure of the airbag as to the passenger in the child seat, such as a newborn, infant, toddler, child, etc. Accordingly, the airbag 150 may be controlled such that the restraining pressure thereof does not affect the passenger in the child seat, i.e., such that the inflating action thereof is suppressed. At this time, from the perspective of protection of the passenger in the child seat, typically, the inflator 140 may preferably be controlled to a gas supply stopped state where the supply of gas to the airbag 150 from the inflator 140 is completely stopped, i.e., a state wherein the inflator itself is not activated (a non-ignited state). Note that a configuration may be employed as necessary where, in the event that a determination is made that the directly seated object is a child seat, the inflator 140 is controlled such that gas is supplied to the airbag 150 at a lower gas pressure or a lower gas flow than in the gas supply mode A.

Also, in the event that a determination is made in step S20 that the directly seated object is a child seat, the installation arrangement of the child seat can be determined based on values of the tension T, including absolute values of the tension T. For example, arrangements such as facing forward, facing sideways, facing backward, and so forth may be determined. The installation arrangement of the child seat can be determined by storing tension data for the cases of installing a child seat facing forward, facing sideways, facing backward, and so forth, by performing testing beforehand, and comparing the tension data with the actually detected tension T data. Accordingly, detailed passenger protection can be implemented for the passenger in the child seat by the inflator 140 and other components (e.g., seatbelt pretensioner) being controlled according to the installation arrangement of the child seat.

As described above, according to an embodiment of the present invention, a passenger protection device 100 capable of implementing thorough passenger protection at low costs can be obtained. That is to say, a determination can be made whether a directly seated object is a passenger 10 or a child seat 12 simply by using a seatbelt sensor 114, so there is no need to use a weight sensor. Furthermore, a known configuration may be used and a determining mechanism with high determining precision may be configured with a simple design. The functions of the weight sensor, which is the known configuration for detecting the physical build of the passenger and so forth, is substituted with the airbag 150 that includes the protection space portion 153 opened toward the passenger at the center region between the right airbag 152 and the left airbag 154, thereby implementing thorough passenger protection regardless of the physical build of the passenger.

Also, according to the passenger protection device 100 of the present embodiment, the structure of the inflator is simplified due to using a single-structure inflator 140 capable of supplying gas at a single pressure, thereby further reducing costs of the passenger protection device.

Also, according to the passenger protection device 100 of the present embodiment, the determination precision of the directly seated object can be further improved by the configuration wherein the directly seated objected is determined based on the change over time of the tension detected by the belt tension sensor 114.

Also, according to the present embodiment, a vehicle installed with a low-cost passenger protection device 100 is provided, furthering cost-reduction advantages of the vehicle.

Note that the present invention is not restricted to the above-described embodiment alone, and that various applications and modifications can be conceived. For example, the following embodiments applying the above-described embodiment can be made.

While the above embodiment described a configuration wherein the belt tension sensor 114 is synchronized with the inflator 140, a configuration may be employed with the present invention wherein the belt tension sensor 114 is synchronized with other objects of control in addition to the inflator 140. Specifically, the belt tension sensor 114 may be controlled synchronously with a buckle sensor or buckle switch stored within the seat belt buckle, or the retractor storing the seatbelt may be synchronized with a sensor for detecting switching from an emergency locked state (ELR) to a standard locked state (ALR).

Also, while the above embodiment described a configuration wherein a passenger protection device uses the passenger-side airbag and seatbelt of an automobile, the present invention can be applied to passenger protection devices of seats other than the passenger seat, such as a second seat, third seat, etc.

Also, while the above embodiment described a case of using an inflator 140 having a single structure wherein single pressure gas can be supplied, the present invention can employ an inflator of a configuration capable of suitably switching the gas supplying pressure in multiple steps.

Also, while the above embodiment described an automotive airbag device, the present invention is a technique applicable to vehicles other than automobiles, such as ships, trains, and so forth.

The priority application, Japanese Patent Application No. 2004-358658 filed on Dec. 10, 2004, is hereby incorporated by reference herein in its entirety.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A passenger protection device for a vehicle, comprising:
an airbag configured to expand and inflate in a passenger protection region, wherein said airbag includes a recessed region that alleviates restraint pressure at a time of restraining a passenger at a middle region of the airbag when the airbag is expanding and inflating, so as to restrain said passenger regardless of a difference in physical build of the passenger on a vehicle seat;
an inflator for supplying gas for expansion and inflation of said airbag;
a seatbelt mounted to the vehicle seat;
a seatbelt sensor configured to detect tension information relating to a tension acting on said seatbelt without using a seat weight sensor; and
a control device configured to determine whether or not a directly seated object on the vehicle seat is a passenger or a child seat based on said tension information from said seatbelt sensor, wherein in the event that a determination is made that said directly seated object is a passenger the control device is configured to control said inflator in a first gas supplying mode such that the recessed region of said airbag expands and inflates with a restraining pressure that is alleviated in relation to said passenger, while in the event that a determination is made that said directly seated object is a child seat, the control device is configured to control said inflator in a second gas supplying mode so as to suppress effects of the restraining pressure of said airbag in relation to the passenger in the child seat;
wherein based on a transition over time of said tension information detected by said seatbelt sensor, said control device is configured to determine that said directly seated object is a passenger when the tension fluctuates over time, and on the other hand the control device is configured to determine that said directly seated object is a child seat when the tension stays generally constant over time.

2. The passenger protection device according to claim 1, wherein said inflator is a single-structure inflator capable of supplying gas at a single pressure; and
wherein said control device is configured to control said inflator so as to supply gas at a single pressure to said airbag as said first gas supply mode in the event that the determination has been made that the directly seated object on the vehicle seat is a passenger, and on the other hand is configured to control said inflator so as to achieve a gas supply stopped state, wherein the supply of gas to said airbag is stopped, as said second gas supply mode in the event that the determination has been made that the directly seated object on the vehicle seat is a child seat.

3. The passenger protection device according to claim 1, wherein in the event that the determination is made that said directly seated object is a child seat, said control device is configured to further determine an orientation of said child seat relative to the vehicle seat based on the tension information detected by said seatbelt sensor.

4. The passenger protection device according to claim 1, wherein said airbag comprises a right airbag which expands and inflates at a right forward side of a passenger, a left airbag which expands and inflates at a left forward side of the passenger, and a space portion which opens toward the passenger at a center region between said right airbag and said left airbag at a time of expansion and inflation of the airbag, wherein said space portion is configured as said recessed region.

5. The passenger protection device according to claim 4, wherein said airbag is configured to restrict movement of the passenger in the left and right directions with the right airbag and the left airbag.

6. The passenger protection device according to claim 4, wherein said airbag is configured to receive a middle portion of the passenger in the recessed region of the airbag.

7. A passenger-protection-device-installed vehicle, comprising:
   a vehicle seat; and
   a passenger protection device that includes;
   an airbag configured to expand and inflate in a passenger protection region,
   wherein said airbag includes a recessed region that alleviates restraint pressure at a time of restraining a passenger at a middle region of the airbag when the airbag is expanding and inflating, so as to restrain said passenger regardless of a difference in physical build of the passenger on the vehicle seat;
   an inflator for supplying gas for expansion and inflation of said airbag;
   a seatbelt mounted to the vehicle seat;
   a seatbelt sensor configured to detect tension information relating to a tension acting on said seatbelt without using a seat weight sensor; and
   a control device configured to determine whether or not a directly seated object on the vehicle seat is a passenger or a child seat based on said tension information from said seatbelt sensor, wherein in the event that a determination is made that said directly seated object is a passenger the control device is configured to control said inflator in a first gas supplying mode such that the recessed region of said airbag expands and inflates with a restraining pressure that is alleviated in relation to said passenger, while in the event that a determination is made that said directly seated object is a child seat, the control device is configured to control said inflator in a second gas supplying mode so as to suppress effects of the restraining pressure of said airbag in relation to the passenger in the child seat;
   wherein in the event that the determination is made that said directly seated object is a child seat, said control device is configured to further determine an orientation of said child seat relative to the vehicle seat based on the tension information detected by said seatbelt sensor;
   wherein based on a transition over time of said tension information detected by said seatbelt sensor, said control device is configured to determine that said directly seated object is a passenger when the tension fluctuates over time, and on the other hand the control device is configured to determine that said directly seated object is a child seat when the tension stays generally constant over time.

8. A passenger protection device for protecting an occupant of a vehicle seat, comprising:
   an airbag including a recessed region at a middle region of the inflated airbag;
   a two operating mode inflator for supplying inflation gas for the airbag, wherein when operating in the first mode the inflator produces more inflation gas then when operating in the second mode;
   a seatbelt and a seatbelt tension sensor, wherein the seatbelt tension sensor is configured to measure tension information relating to a tension acting on the seatbelt without using a seat weight sensor; and
   a controller configured to determine, based on a signal from the seatbelt tension sensor, whether or not a passenger or a child seat is present in the vehicle seat; and wherein if the controller determines that a child seat is present in the seat the control device controls the inflator to operate in the second mode;
   wherein based on a transition over time of said tension information detected by said seatbelt sensor, said control device is configured to determine that said directly seated object is a passenger when the tension fluctuates over time, and on the other hand the control device is configured to determine that said directly seated object is a child seat when the tension stays generally constant over time.

* * * * *